United States Patent [19]

Fitch, Jr.

[11] Patent Number: 5,523,101
[45] Date of Patent: Jun. 4, 1996

[54] APPARATUS FOR APPLYING MATERIAL TO A RECEIVER

[76] Inventor: Clifford E. Fitch, Jr., R.R. #2, Box 74C, Beecher, Ill. 60401

[21] Appl. No.: 92,511

[22] Filed: Jul. 16, 1993

[51] Int. Cl.⁶ .................... A21C 9/04; B05C 5/02
[52] U.S. Cl. .................... 426/289; 426/496; 426/549; 426/653; 118/24; 118/30; 118/677; 99/494; 99/450.7; 177/60; 177/120; 198/464.2; 198/572
[58] Field of Search .................... 426/289, 496, 426/549, 653; 118/16, 24, 30, 677; 99/450.1, 450.7, 494; 198/464.2, 464.4, 502.1, 502.2, 572, 573; 177/60, 116, 119, 120

[56] References Cited

U.S. PATENT DOCUMENTS

| | | | |
|---|---|---|---|
| 1,994,797 | 3/1935 | Thomas | 177/119 X |
| 3,193,029 | 7/1965 | Harvison et al. | 177/120 |
| 3,241,625 | 3/1966 | Soojian | 177/120 |
| 3,283,740 | 11/1966 | Fredricksen | 118/24 |
| 3,368,501 | 2/1968 | Kuhlman | 107/1 |
| 3,522,854 | 8/1970 | Liedtke | 177/119 |
| 3,633,489 | 1/1972 | Spoelhof et al. | 99/450.7 |
| 3,648,596 | 3/1972 | Zito | 118/24 X |
| 3,682,106 | 8/1972 | Kuhlman | 107/1 |
| 3,725,974 | 4/1973 | Kuhlman | 17/32 |
| 3,760,715 | 9/1973 | Grote et al. | 426/289 X |
| 3,779,205 | 12/1973 | Kuhlman | 118/24 |
| 3,780,643 | 12/1973 | Papai | 99/450.7 |
| 3,858,545 | 1/1975 | Fischer et al. | 118/13 |
| 3,908,584 | 9/1975 | Rague | 118/16 X |
| 3,943,601 | 3/1976 | Kuhlman | 17/32 |
| 3,945,448 | 3/1976 | Sellers | 177/119 X |
| 3,980,235 | 9/1976 | Kuhlman | 241/84 |
| 4,128,074 | 12/1978 | Rejsa | 118/24 |
| 4,152,976 | 5/1979 | Kawasaki et al. | 117/120 X |
| 4,197,794 | 4/1980 | Rague et al. | 118/24 X |
| 4,225,001 | 9/1980 | Gillenkirch | 177/119 X |
| 4,248,173 | 2/1981 | Kuhlman | 118/20 |
| 4,264,634 | 4/1981 | Hochandel et al. | 426/289 |
| 4,778,365 | 10/1988 | Archer | 425/73 |
| 4,832,961 | 5/1989 | Aoki | 425/239 |
| 4,839,185 | 6/1989 | Gram | 426/512 |
| 4,850,845 | 7/1989 | Hicks | 425/289 |
| 4,907,720 | 3/1990 | Henson et al. | 426/289 X |
| 5,073,391 | 12/1991 | DeMars et al. | 426/231 |

OTHER PUBLICATIONS

Bill Stein, "On–Line Weighing System Slashes Inventories, Speeds Processing," *Modern Materials Handling*, (Oct., 1988) p. 123.

"Computer Feedback on Lines Holds Bags to Target Weights", *Package Engineering*, (Sep., 1972) pp. 56–59.

"Electronic Scales Measure Up on Filing, Assembly Lines", *Package Engineering*, (Aug., 1982) pp. 65–66.

Kate Bertrand, "Computerized Scale System Cuts Give-–Away, Waste," *Package Engineering*, (Jan., 1982) pp. 85–86.

Jay Hargrove, "Computerized QC System Streamlines Weight Checking", *Packaging Engineering* (Jan., 1982) pp. 94, 96.

*Primary Examiner*—Donald E. Czaja
*Assistant Examiner*—Milton I. Cano
*Attorney, Agent, or Firm*—Wallenstein & Wagner, Ltd.

[57] ABSTRACT

Uniform distribution of materials over a predetermined area of a receiver is assured by a multipurpose applicator wherein a gauging or metering device contacts materials on a conveyor to ensure that the materials are uniformly spread along the conveyor so that incremental movement of the conveyor results in a predetermined portion of the materials entering a distributor wherein it is agitated to form a cloud that will fall evenly over the predetermined area defined by a mask on the receiver. An electronic weighing device between the conveyor and the distributor may be used to achieved exact weight of portions.

22 Claims, 5 Drawing Sheets

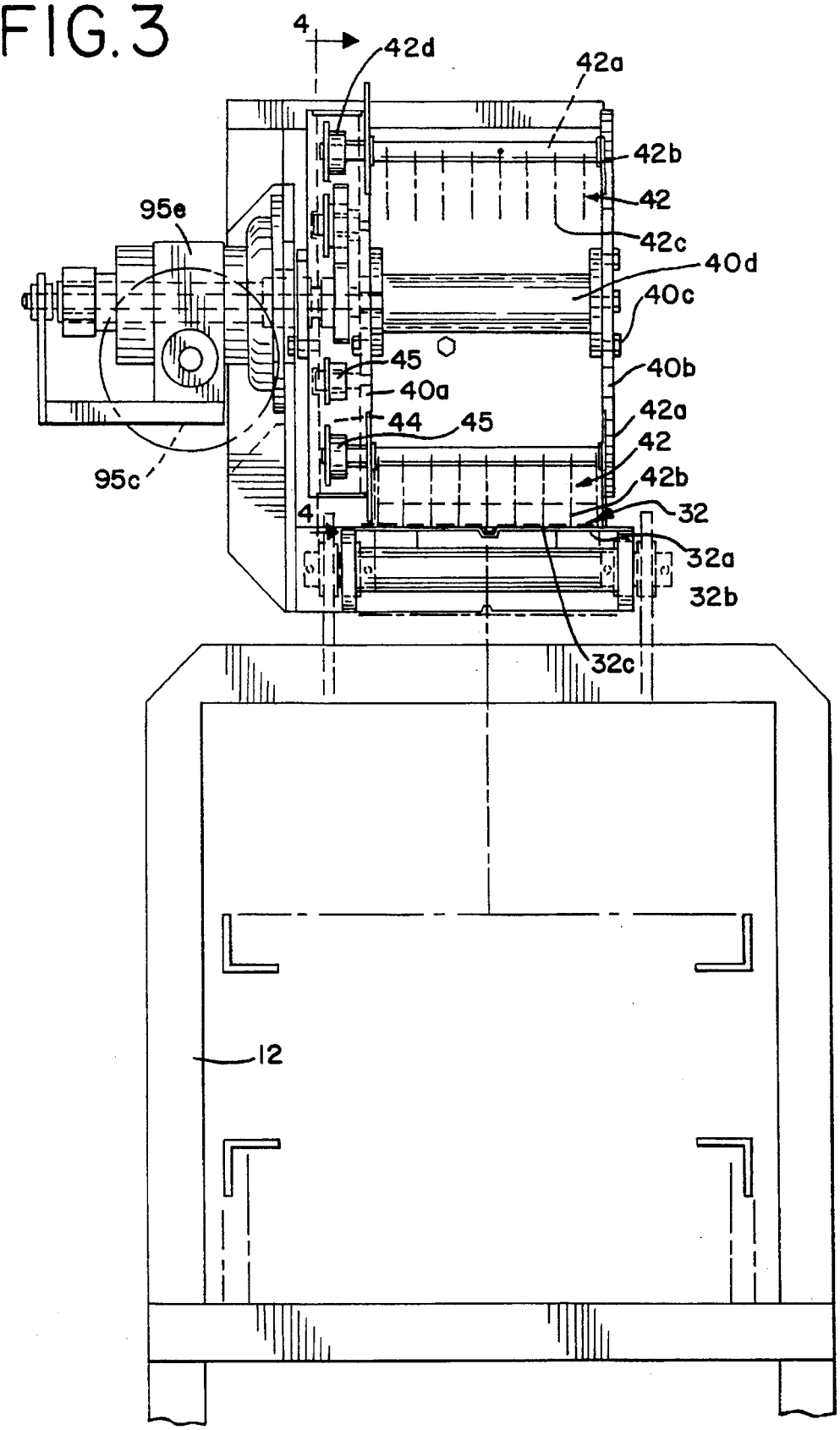

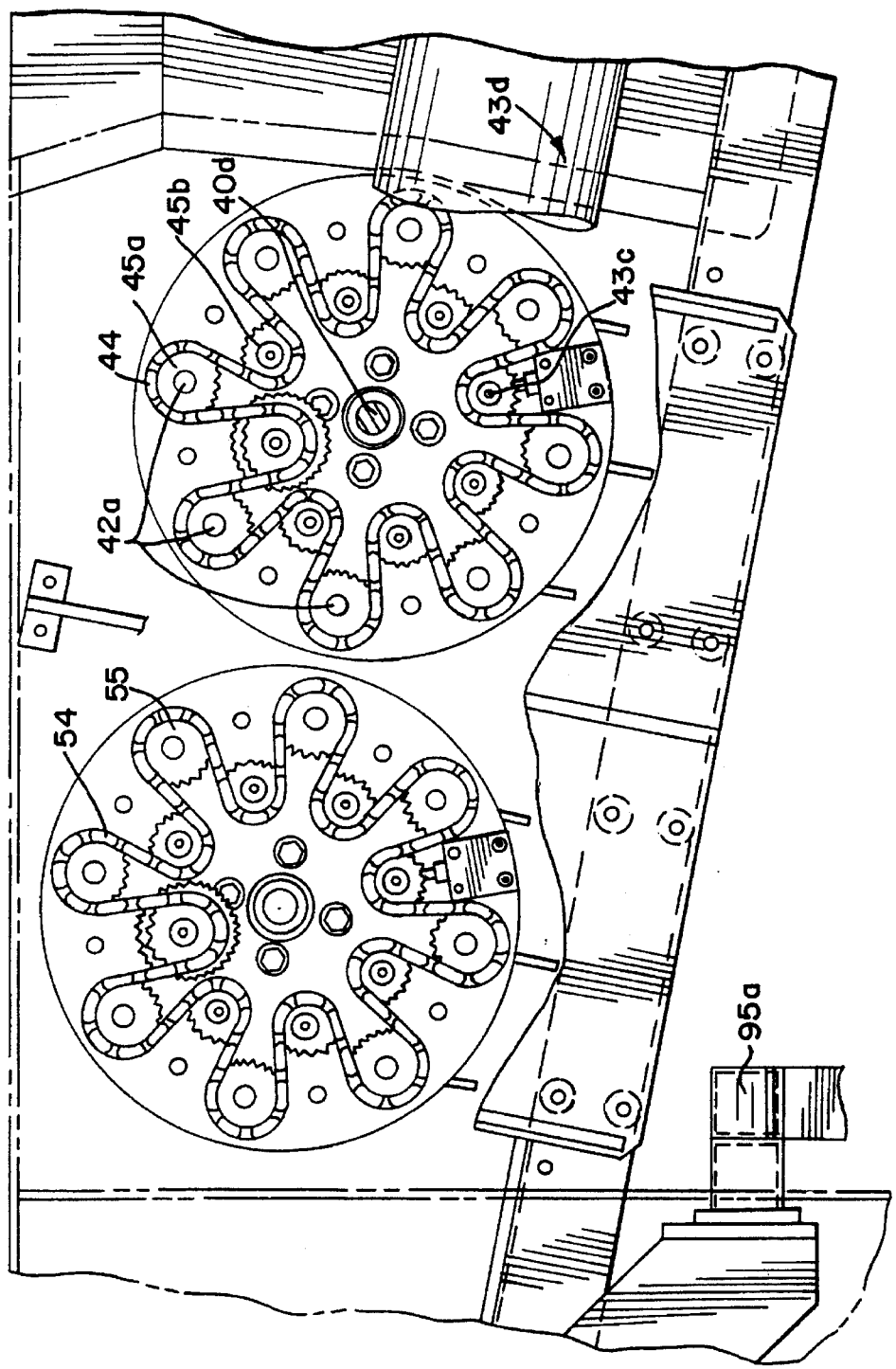

APPARATUS FOR APPLYING MATERIAL TO A RECEIVER

DESCRIPTION

TECHNICAL FIELD OF THE INVENTION

This invention relates generally to a means for the uniform distribution of materials over a predetermined area and more specifically concerns a modular, completely automatic, multipurpose apparatus for the uniform application of a precise portion of discrete particles of material over a predetermined masked area. The elements of the invention are described in terms of a preferred embodiment wherein portions of food materials, such as, for example, cheese, vegetables and meat are deposited on a receiver means such as a pizza crust.

BACKGROUND OF THE INVENTION

In the preparation of products such as pizzas for example, it is important that a consistent high quality and appearance be effectively achieved at lowest cost with a minimum of labor, maintenance and investment. To this end, a number of different approaches have been taken in the past. Included among the prior art are pizza making devices in which a belt conveyor having material thereon moves under a stationary rake that meters out a generally uniform thick layer of materials thereon to be moved continuously over and in the same direction as a conveyor on which pizza crusts are positioned whereby at the end of the conveyor the material drops over the entire surface of the lower belt including, but not limited to, the pizza crusts. With this approach it is usual to provide a further means to collect the materials which do not land on the crust and effectively recycle them. In addition to using recycled materials, the prior art provides a relatively non-uniform portion of the material and leaves materials on certain areas of the pizza crust where it is not desired and will detract from the appearance and later, use, of the product. Moreover, for example, with new ingredient labelling laws and nutrition consciousness by purchasers, it is important that the weight of the ingredients, such as the pizza topping, for example, be very accurate. Hence, the inexact approaches of the prior art may no longer be acceptable.

SUMMARY OF THE INVENTION

The deficiencies of the prior art are overcome by a multipurpose applicator means according to the invention herein wherein material is very accurately metered by quantity and/or weight into portions of predetermined size and then efficiently and accurately distributed in a predetermined pattern on a predetermined area of a receiver. This assures that each product will have a minimum weight or quantity of material, but little, if anything, more than that minimum quantity and that further each portion of the product, as for example, a piece of pizza, will have the same uniform amount of material whereby consumers will know exactly what they are getting with each pizza or slice thereof for example.

Uniformity of portions is achieved by a gauging or metering means along the path of movement of the materials to produce a predetermined transverse cross-section of material that provides a specific amount of material per increment of length of a first transport means. With this uniform specific amount of material per increment of length, the accurate control of the movement of the transport means by a suitable means will allow an accurate predetermined amount of material to be obtained by specific predetermined movement of the transport means. Where it is desired that the weight be exactly controlled, in lieu of or in addition to the quantities to be achieved by the foregoing, a weight control means may be situated between the transport means and the distribution means. This weight control means is interactively connected with the means for controlling the movement of the transport means so that the transport means will be caused to move until the exact weight is registered on the weight control means.

The accurately determined portion of material is moved into a distribution means for distribution over a predetermined area in a predetermined pattern. According to an embodiment of the invention, the distribution means is a rotating impeller which contacts material dropped near its center to effect a cloud-like pension which falls by weight of gravity onto a receiving area defined by a mask means. The mask means is configured in relationship to the receiver or product to which the materials are to be applied and may be moved into and out of operative relationship with the product or receiver to define the area in which the material is distributed. This has great advantages over the prior art in the manufacture of pizza because it accurately defines the area and avoids recycling of the toppings and more importantly avoids the application of toppings to areas of the pizza crust where it is not desired such as the border crust. This makes the pizza more attractive in appearance and avoids the materials falling off the border of the crust during subsequent handling.

Placement of the receiver or product below the distribution and mask means is achieved by a second transport means controlled by the control means so that the product is accurately positioned with regard to the mask means.

Again, in the manufacture of pizzas having several toppings, it is contemplated that a plurality of applicators will be positioned adjacent to each other along a line of movement of the receiver or product whereby as the product or receiver moves intermittently along the second transport means, various toppings are accurately and uniformly deposited thereon in an efficient, fast manner with a minimum of labor. A modular construction on a flexible frame structure allows quick and accurate set up and break down to meet nearly all production requirements.

Each of the components and elements of the applicator means may be readily adjusted and detached for quick changeover of materials and/or cleaning as required.

From the foregoing it will be seen that we have produced an invention which overcomes the deficiencies of the prior art and provides a multipurpose, fully automatic applicator system for the application of precise portions of material in a consistent manner and pattern to achieve consistent product quality and appearance. With the incremental modular second transport means, each applicator means is free standing and may be operated in conjunction with one another by simply positioning them adjacent to each other.

Other advantages and aspects of the invention will become apparent upon making reference to the specification, claims, and drawings to follow.

DESCRIPTION OF THE DRAWINGS

FIG. 3 is an elevational end view taken along the lines 3—3 of FIG. 2;

FIG. 4 is an enlarged elevational partial view taken along lines 4—4 of FIG. 3;

DETAILED DESCRIPTION OF THE INVENTION

Figure 1:
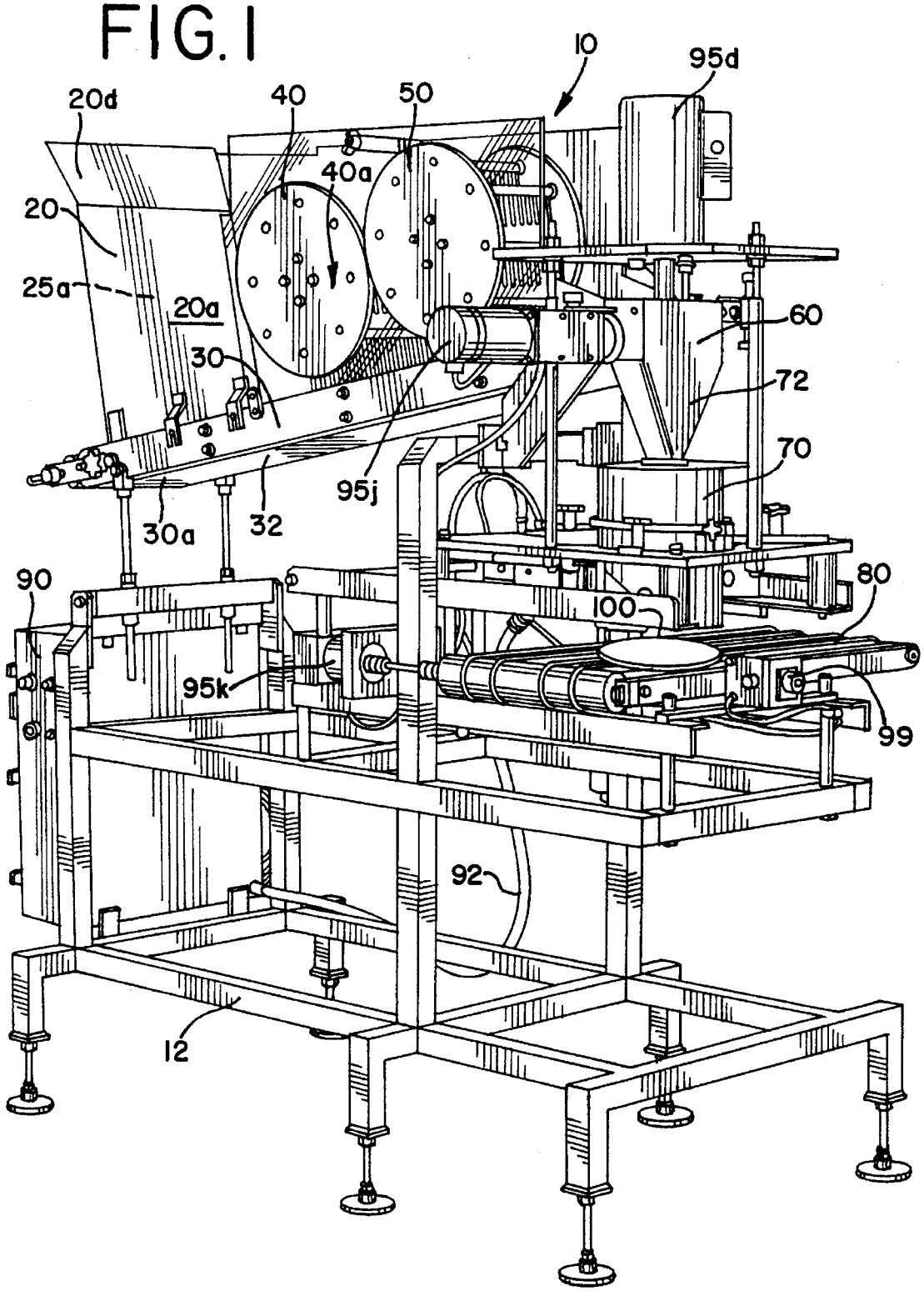
FIG. 1 is a perspective elevational view of an embodiment of a multipurpose applicator means according to the invention.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to embodiment illustrated.

As shown in the embodiment of FIG. 1, the invention comprises a multipurpose applicator means generally indicated at 10 for applying a predetermined portion 25a of material 25 to a predetermined area 100a of a receiver means 100. The materials 25 are held in a material supply means 20 having a first transport means 30 therebelow which will move the material 25 incrementally in a path from the supply means 20 to a distribution means 70 wherein a predetermined portion 25a of the materials are excited and cause to form a cloud-like dispersion of the materials which will fall in a manner such as snow over a specific predetermined area 100a of the receiver means 100. A gauging or metering means 40, 50 located above and across the first transport means 30 between the material supply means 20 and the distribution means 70 contact the materials 25 as it passes thereunder on the first transport means to generate a predetermined transverse cross-section of material on the transport means 30. This assures that each increment of the first transport means 30 has the same depth or cross-sectional configuration and hence that the same amount of the material 25 is thereon so that a predetermined movement of the transport means 30 will deposit a predetermined amount of material at the distribution means 70 or weight control means 60.

Where it is desired that an exact weight of a portion of materials be achieved in lieu of or as a double check on the quantity of material, a weight control means 60, such as a load cell discussed below, may be interposed between a second end 30b on the transport means 30 and the distribution means 70. This weight control means 60 may be interactively connected to a control means 90 which controls the movement of the first transport means 30 so that the transport means 30 is caused to move until a predetermined weight of material 25 is received by the weight control means 60 at which time the first transport means 30 is caused to stop. The portion of materials 25w will then be permitted to pass under the force of gravity into the distribution means 70. A mask means 73 is movable from a non-operative position into an operative position over the receiver means 100 to contain the dispersion of materials 25 and conform the gravitational deposition of that cloud onto the predetermined location 100a of the receiver 100 and avoid deposition on other areas 100b.

Figure 2:
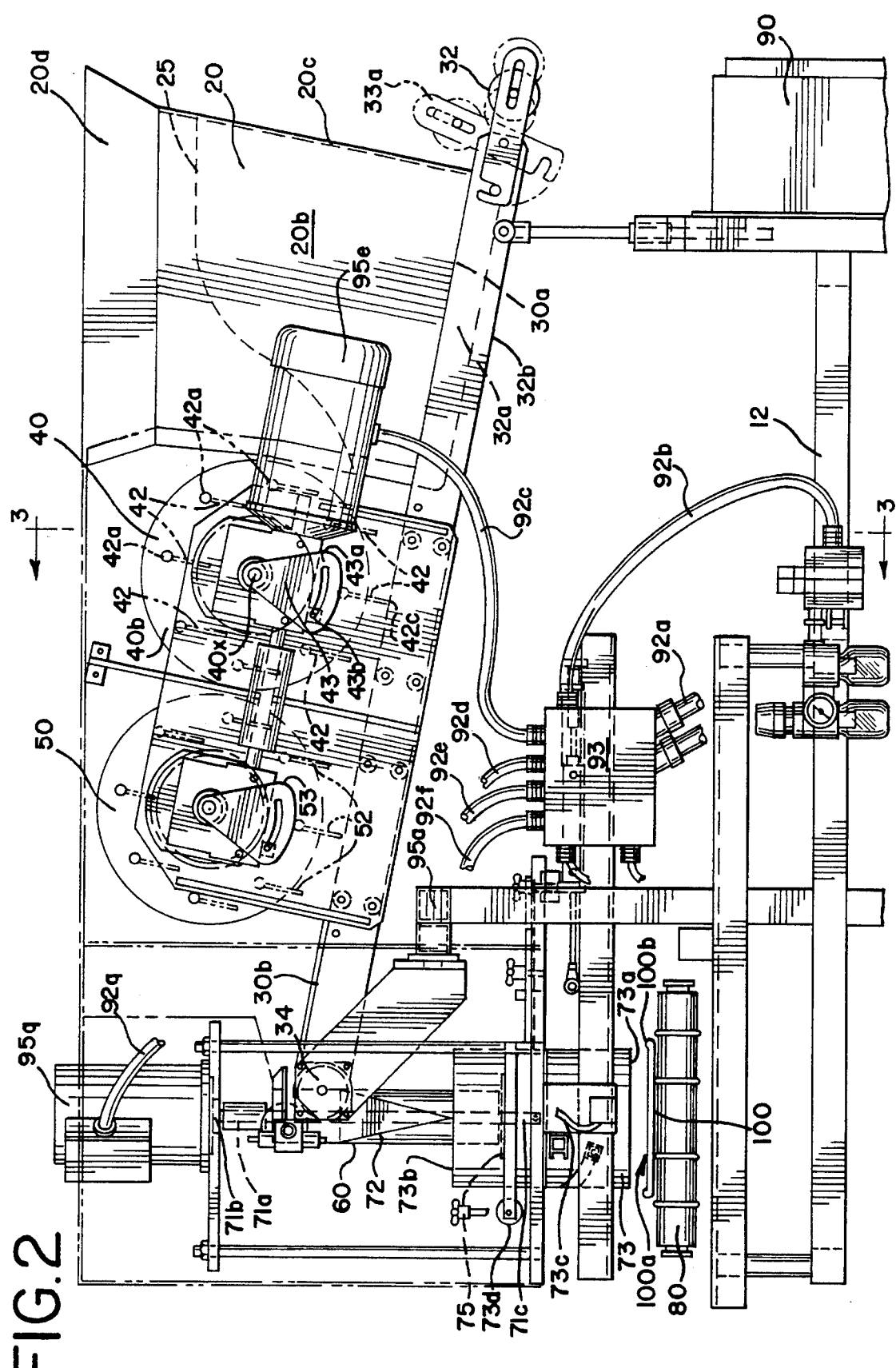
FIG. 2 is an enlarged elevational partial view of the applicator means taken from the backside of the view shown in FIG. 1.
Figure 6:
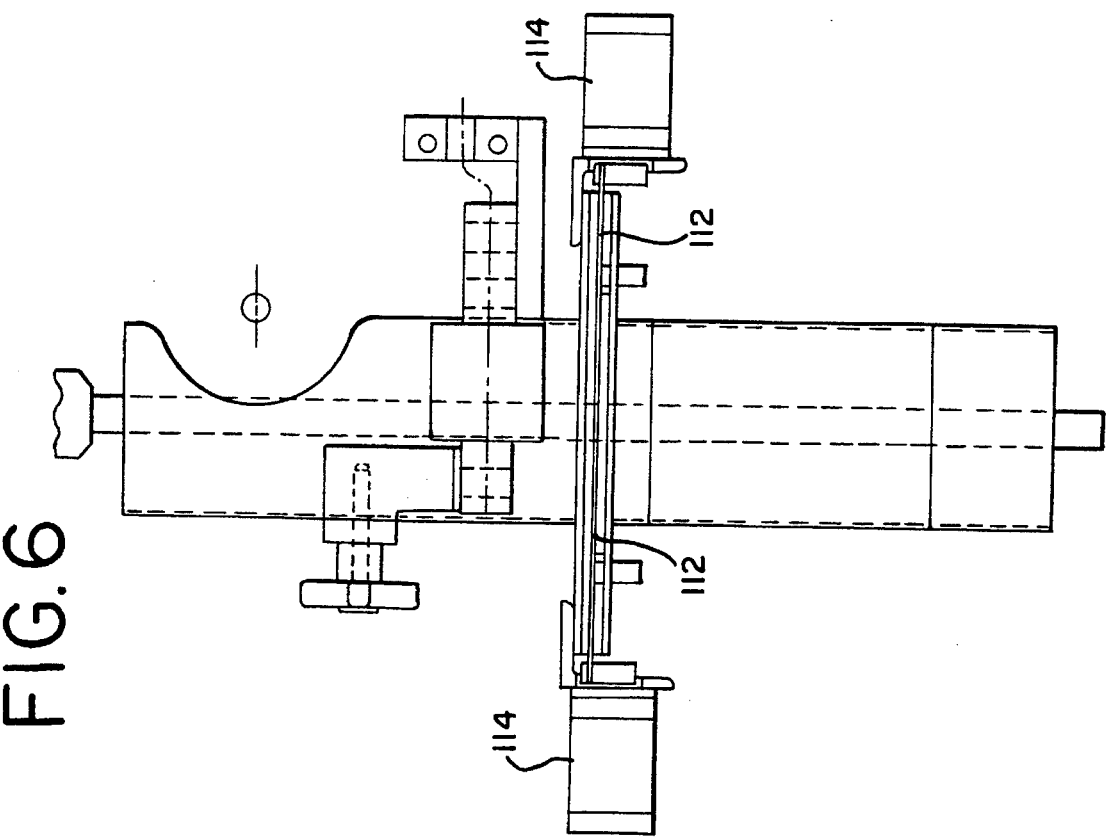
FIG. 6 is a view similar to FIG. 5, but taken from an angle 90° from that of FIG. 5.
Figure 5:
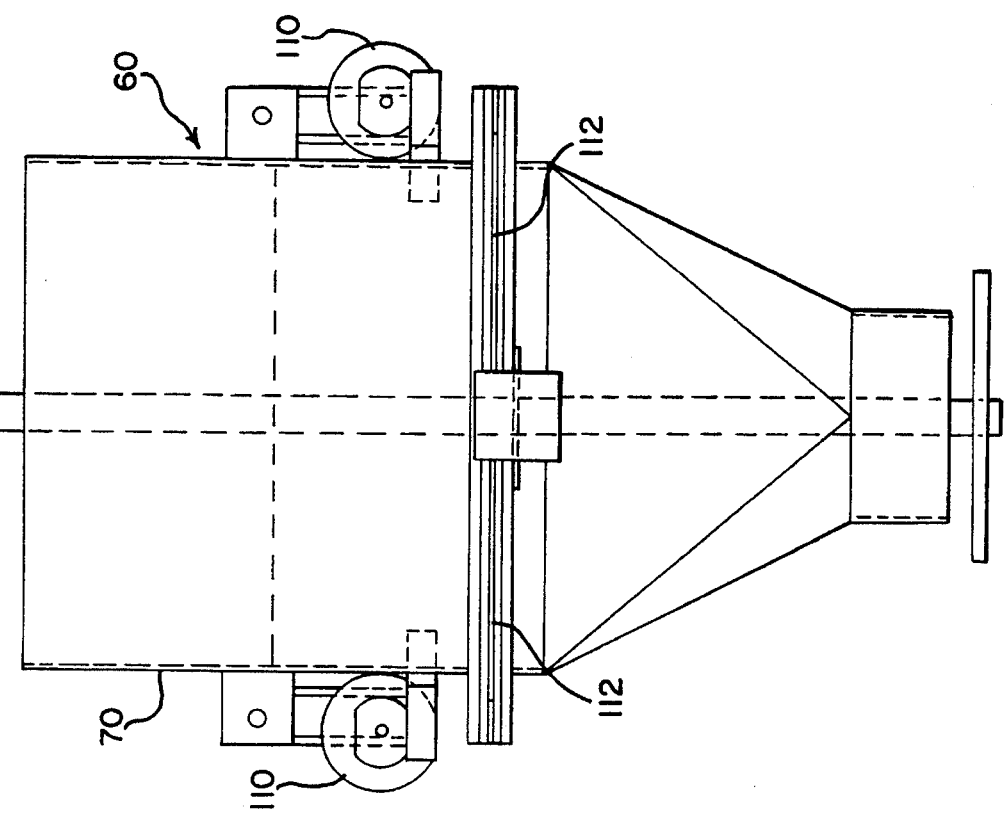
FIG. 5 is an enlarged sectional view of a weight control means of the present invention.

The material supply means 20 as shown in FIGS. 1 and 2 is adapted to receive a supply of the materials 25 to be distributed onto the receiver 100. These materials 25 are replenished from time to time by suitable means in accordance with conditions of usage. As shown, the supply means 20 may take the form of a three-sided bin having parallel sides 20a, 20b, on opposite sides of the first transport means 30 and upstanding therefrom with a backside 20c connecting the rear edges of the portions 20a, 20b so that the backside 20c extends transversely across the first transport means 30 to form the three-sided bin structure. Each of the sides 20a, 20b, 20c may have an outwardly flaring upper portion 20d that facilitates filling of the supply means 20. The supply means 20 may be positioned directly over a first end 30a of the first transport means 30 so that the transport means acts as the lower or floor portion of the supply means 20.

The first transport means 30 preferably comprises an endless belt 32 with an upper surface 32a having roller means 33 at the first end 30a and a roller means 34 at the second end 30b. The belt 32 may be of a material and texture suitable for the materials 25 being transported as will be understood by those skilled in the art. As may be best seen in FIG. 3, a relatively rigid undersupport 32c may be provided to support the belt 32 in a predetermined manner and profile so, for example, the belt does not sag along the longitudinal or transverse dimensions and thus helps assure a uniform cross-section of material 25. Also, suitable means 33a for a quick change of the belt and appropriate tensioning may be provided. In practice we have found that inclining the belt upwardly from the end 30a to the end 30b provide advantageous results in the gauging or metering of the materials carried thereby and effectively lowers the height of the top of the bin or supply means 20. The belt 32 moves in a direction so that the upper surface 32a of the belt moves up the incline to carry the material 25 from the supply means 20 past the gauging means 40 and 50. While a belt is contemplated in this environment, it will be understood that a screw conveyor means may also be employed.

First gauging means 40 is shown to comprise a pair of circular disks 40a, 40b situated in planes generally parallel to each other and positioned on opposite sides of the belt 32. Rod-like transverse members 42a extend therebetween at a plurality of positions interior from the outer circumstance of the sides 40a, 40b. Attached to each of the transverse members 42a are rake means generally indicated at 42 each having a plurality of spaced depending members 42b. The rake means 42 may be manually set to all depend in the same direction and angle from the transverse members 42a so that as they pass closest to the belt surface 32a the distance between the end tip 42c of each of the depending members 42b and the top surface 32a of the belt is the same predetermined distance from each rack means 42. It will be understood that changing the angle and position of the rake means 42 will change the distance between the tip 42c of the depending members 42b and the upper surface of the belt 32a so that effectively the amount of material carried by the belt 32 may be carefully regulated. The angle of the rake means 42 may be changed by the adjustment means 43. This adjustment may be effected as shown in FIG. 2 by an adjustment gauge 43a having a suitable indicator 43b. Rotation of the means 43c, causes a chain 44 to move over sprockets 45a that are connected to the ends of the transverse members 42a and thereby change the angle of all of the rake means 42 exactly the same amount. The change in angularity is reflected on the indicator 43b and is locked in position by suitable means 43d. Additional sprockets 45b are attached to the side plate 40a and positioned to allow exact adjustment by means of chain 44.

The gauging or metering means 40 rotates smoothly around a suitable axle means 40*d* in a direction so that the tip 42*c* of each depending members 42*b* is moving in a direction opposite to the movement of the belt surface 32*a* whereby materials being moved along the belt 32 will be raked back toward the supply means 20 to start to establish a bed depth of material 25 on the belt 32 as it moves thereunder. Thus, the rake means 42 knocks excess material 25 back into the supply bin 20 and serves to establish the depth of the material 25 on the first transport means 30. In use with cheese materials for application to pizza we have found that rotating the metering means 40, 50 at about 30 rpm produces excellent results.

A second gauging means 50 may have a structure identical to the gauging means 40 and accordingly the description may be considered repeated by adding a value of 10 to each so that with the numbers in the 50 series are the same and have the same function as the numbers in the 40 series. A difference between gauging means 40 and 50 is that, the angle of the rake means 52 may be independent of the angle of the rake means 42 so that the same or different depth of material 25 may be achieved as it passes below the second means 50 on the belt structure 32.

As shown in FIGS. 2 and 3, the gauging means 40, 50 may have a common drive means such as a motor 95*e* held in position by suitable brackets 95*c* and having a power and control means 92*c* operatively connected thereto.

Movement of the belt 32 may be effected by driving roller 34 by a suitable power train generally indicated by the structure 95*a* as shown in FIG. 2. The power means may be of any suitable form such as electric or air propelled motors and all are controlled by control means 90 to operate in an exact predetermined sequence.

With the materials 25 uniformly spread along the conveyor means 32, it will be understood that incremental movement of the conveyor 32 results in a predetermined portion of the material entering a distribution means 70. As may be seen from FIGS. 1 and 2, the distribution means includes an upper funnel structure 72 which directs the falling materials against a spinning impeller means 75 that contacts and excites the individual particles to form a cloud-like dispersion materials 25 that falls in a snow-like manner onto a receiver 100 in a predetermined area 100*a*. The impeller means 75 may be suitably driven through a shaft 71*a* having an upper end thereof 71*b* connected to a suitable power means 95*g* which in turn receives its power and control through a suitable means 92*g*. The impeller 75 is attached to a lower end 71*c* of the drive shaft and may be of different design and be driven at a different speed depending upon the type of material being dispensed as well as the area over which the material is to be dispensed and the type of final material pattern desired for the receiver. In practice we have found that concentrating the flow of the material 25 downwardly to the center of the impeller means 75 as it is rotating produces a more uniform distribution.

An important aspect of the invention is the provision of a mask means 73 which surrounds the impeller 75 and extends above and below to contain the cloud-like dispersion of materials 25 and conform the deposition of the cloud-like dispersion of materials 25 onto the predetermined location 100*a* of the receiver means 100. The mask 73 is movable upwardly to facilitate movement of the receiver means 100 thereunder. In final or downward position, the mask 73 has its lower edge 73*a* just above, but not necessarily touching, the receiver means 100 and defining the receiving area 100*a*. Movement of the mask means 73 is effected by a suitable power means 73*c*. Guide means such as indicated generally at 73*d* may be provided to accurately control its position. The mask means 73 has a predetermined cross-sectional configuration which, as shown in FIG. 2, is smaller in size than the receiver means 100 whereby the materials 25 are prevented from contacting an outer border portion 100*b* of the receiver means 100. The cross-sectional planar configuration of the mask means 73 may be of any shape. In the embodiment illustrated wherein pizza toppings are supplied, the configuration will generally be circular, however, rectangular or other configurations may also be used.

It will be understood that the control means 90 causes the second transport means 80 to move exactly until the receiver means 100 is positioned precisely under the lower edge 73*a* of the mask means 73. A suitable receiver presence sensing means 99 may be applied to assure this exact determination.

Where it is desired that an exact weight of each portion of material 25 be achieved in addition to or in lieu of the quantity measurement, a weight control means 60 may be provided to weigh a portion of the materials 25 dropping from the conveyor means 32 before they are released to the distribution means 70. To this end we have provided a scale weight control structure interactively connected to the control means 90 so that the belt 32 of the first conveyor means 30 will continue to be moved incrementally until the desired weight of a portion of materials 25 is received at which time the movement of the first transport means 30 is stopped. To achieve the maximum speed of operation, the control means 90 are programmed so that the first transport means 30 moves rapidly at the beginning of the weighing of each portion, such as until reaching 90–95% of the desired weight, and slows down dramatically to incrementally meter the remaining material to achieve the desired weight of material. The specifics of the relative speeds are dependent on the particular material being supplied. With the weight control means, the movement of the transport means 30 is ultimately continued or stopped by the weight control means 60. Thus, when the predetermined weight of the portion of materials is reached, the weight control means will operate to allow the material 25 to continue into the distribution means 70 in a precisely weighted batch.

The weight control means is shown more particularly in FIGS. 5 and 6, which will be discussed together.

The weight control means 60 includes a pair of conventional load cells 110 which support the distribution means 70. A pair of cooperating, horizontally acting gates 112, shown in their closed position in FIG. 5, retain the material as the material is metered into the distribution means 70, thus permitting the load cells 110 to measure the precise amount of material. Once the correct amount of material has been conveyed into the distribution means, the gates are opened by means of pneumatic operators 114, permitting the precisely measured material to enter the funnel structure 72.

As will be understood by those skilled in the art, from a review of the Figures of drawings, a suitable frame means generally indicated at 12 may be provided to suitably position and hold the various elements of the applicator structure to achieve efficient operation. It will be noted that there are great numbers of adjustable aspects to the invention in that the same elements and general structure may be adapted to a wide variety of materials and products to be produced. For example, in the embodiment for applying toppings to pizza it will be understood that the materials to be deposited may comprise, for example, cheese, meat, vegetables, etc. in any specific order and that toppings may be applied sequentially by an arrangement of applicator means 10 aligned so that the movable second carrier means 80 of each applicator 10 will be operatively related whereby, for example, receiver means 100 in the form of a pizza crust may move first to an applicator means carrying cheese material and/or second to an applicator carrying vegetable materials and/or third to an applicator carrying meat material. Each may be programmed to operate independently or the whole sequence may be controlled by a programmable master control means interconnecting the controllers 90.

As may be seen with reference to FIG. 1 particularly, the method of applying a material means 25 to a predetermined area 100a on a receiver means 100 includes the steps of providing a supply of material 20 in a hopper means positioned above a first conveyor means 30 moving the first conveyor means belt 32 thereby drawing material from the bottom of the supply means 20 and moving it upwardly towards a distribution means 70, gauging or metering the material as it moves along the path of the material 25 on the belt 32 past a raking means 42 set a predetermined distance from the surface 32a thereby contacting the material 25 and creating a uniform, cross-sectional depth of the material 25 on the conveyor surface 32a whereby each increment of the first conveyor means 30 will carry a uniform amount of material 25. The steps of raking the material in the first gauging or metering means 40 results in creating an initial bed depth of material and raking the material again in a second gauging or metering means 50 results in creating a uniform cross-section of material 25 on the belt 32. Moving the rake means 42, 52 in a direction opposite the direction of movement of the belt 32 at a predetermined speed is typically dependent on the type of material being applied and the thickness of material 25 desired. Depositing the material 25 into a distribution means 70 and directing it towards the center of a rotary-driven impeller 75 allows the impeller to contact the pieces of material and excite them to form a generally cloud-like dispersion of materials 25 which falls in a snow-like manner to the receiver 100 in a uniform or predetermined pattern over an area 100*a*. The method includes moving a receiving means 100 into exact position below the distribution means and specifically directly below a predetermined masking means 73 and moving the masking means into an out of position adjacent to or in contact with the receiver means 100 thereby containing the cloud-like dispersion of materials 25 and causing the material to be deposited onto a predetermined location on the receiver means 100 in an area 100*a*. The mask means 73 may be of any cross-sectional configuration so that in the application to pizza, for example, it will leave a border 100*b* having no topping thereon.

It will be understood by those skilled in the manufacture of machines that the invention here will include such things as bearings and lubrication between moving parts, belt tension equalizers across the width so that the belts track accurately on the rollers, the use of stepper motors to achieve exact movement of various elements and full wiring and connection of the motor and control means.

Also, for food use the elements will conform to all applicable laws so that, for example, stainless steel materials will be employed.

It is an important aspect of the invention that the applicator have a small footprint so that they may be closely spaced if required. This is achieved by arranging the elements in a compact and efficient manner, as for example, with the supply means 20 and gauging means 40, 50 directly over the transport means 30; while positioning the control means and motor means 90 therebelow.

Also, it is an important aspect of the invention that it be readily and easily cleanable so that as required from time to time or when materials are changed, the elements may be quickly accessed with suitable cleaning means or removed for cleaning.

By the foregoing means it will be understood that a multipurpose applicator means has been produced for the preparation of products such as pizza, for example, that produces a consistent high quality and appearance at lowest cost and with a minimum of labor, maintenance and investment. The applicator means is applicable to many different products and is modular and completely automatic so that a precise portion of discrete particles are uniformly applied over a predetermined area of the product.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details.

I claim:

1. A multipurpose applicator for applying a predetermined portion of materials to a predetermined area of a receiver means in a generally predetermined pattern comprising:

a material supply means to provide a supply of materials to be applied to the receiver;

a first transport means to move the materials incrementally in a path from the supply means to an application location from which the materials may be applied to the receiver;

a second transport means to move the receiver means to a predetermined location where the materials are to be applied;

a gauging means for contacting the materials on said first transport means to assure that each increment of the first transport means has the same predetermined portion of materials thereon, the gauging means having means for adjusting an angle of the gauging means such that the distance between the gauging means and the first transport means is varied to regulate an amount of materials moved by the first transport means;

a distribution means to receive the predetermined portion of materials and create a uniform distribution of the predetermined portion of materials over the predetermined area of the receiver; and a system control means for synchronizing the operation of the first and second transport means and distribution means.

2. The multipurpose applicator means according to claim 1 further comprising a material portion weight control means (60) interactively connected to said control means (90) and adapted to receive materials from said first transport means and weigh said materials (25) received from said first transport means and continue movement of said first transport means until a predetermined portion by weight of material has been received and then stop the movement of said first transport means.

3. The multipurpose applicator means of claim 2 wherein said portion weight control means (60) is an electronic scale that permits the predetermined portion of material to pass thereby after being weighed whereby the predetermined portion of material will drop under the force of gravity into the distribution means.

4. The multipurpose applicator of claim 1 wherein said distribution means includes a means for exciting the predetermined portion of materials to effectively create a dispersion of said predetermined portion of materials which is adapted to fall in an even distribution pattern over the predetermined area of said receiver.

5. The multipurpose applicator of claim 4 including a rotating impeller means, wherein said dispersion is created by said rotating impeller means that contact and excite the portions of material after they enter said distribution means.

6. The multipurpose applicator of claim 5 including means for funneling the particles of materials into an area near the center of the rotating impeller means to assure a more uniform distribution of said materials on said receiver.

7. The multipurpose applicator of claim 5 wherein the control means includes speed control means for adjusting the rotary speed of said impeller.

8. The multipurpose applicator of claim 4 wherein said distribution means further includes a mask means adapted to contain said dispersion of materials and conform the deposition of said dispersion of materials onto a predetermined location on said receiver, said mask means being automatically moveable by power means into and out of an operative predetermined position over the receiver.

9. The multipurpose applicator of claim 8 wherein said mask means is of a predetermined cross-sectional configuration in plan view that is smaller in size than the receiver means whereby the materials are prevented from contacting a border portion of the receiver means outside the mask means.

10. The multipurpose applicator of claim 9 wherein said gauging means includes a first and second gauging means, said first and second gauging means being mounted seriatim along and over the path of said first transport means whereby said depending members of said first and second gauging means lie over and across said first transport means and are adapted to move in a direction generally opposite to the direction of movement of said first transport means along said path, said depending members of said first gauging means being closest to said material supply means and being adapted to initially engage said materials as they leave said material supply means and pass below on said first transport means and effectively meter the amount of said materials that pass thereby on said transport means, said depending members on said second gauging means adapted to sequentially contact the materials on said first transport means at a predetermined height thereabove as said materials are moved therebelow to assure that each incremental length of said first transport means has uniform amount of materials.

11. The multipurpose applicator of claim 1 wherein the position and height of the depending members may be set to achieve a predetermined clearance from said first transport means and wherein each of said transverse members is connected to an adjustment means that rotates the transverse members to change the angle of the depending members, said depending members moving in a direction generally opposite to the direction of the movement of said first transport means along its path to effectively gauge the material on said first transport means.

12. The multipurpose applicator means of claim 1 wherein said supply means is a hopper structure positioned over a first end of said first transport means and adapted to receive and hold material to be distributed therein, said first transport means being an endless belt structure inclined upwardly from said first end to a second end adjacent said distribution means whereby material may be transported from said first end to said second end past said guaging means and into said distribution means.

13. A plurality of applicator means as set forth in claim 1 wherein each of said applicator means is positioned for sequential application of different materials to a receiver that is adapted to be moved incrementally along said second transport means.

14. A method of applying material to a receiver in a predetermined pattern comprising the steps of providing a supply of materials in connection with a first conveyor means, moving the first conveyor means to draw material from the supply means, providing a gauging means for contacting the materials having means for adjusting an angle of the gauging means such that the distance between the guaging means and the first conveyor means is varied to regulate the material moved by the first conveyor means, raking the material on the first conveyor means while it is thereon and being moved to a distribution means whereby each increment of said first conveyor means will carry a uniform amount of material, incrementally moving the material along the first conveyor means to the distribution means, the distribution means having a spinning impeller, depositing a predetermined portion of materials into the distribution means, moving said receiving means into a position where it can receive the predetermined portion of materials, wherein the deposited portion of materials is excited by the spinning impeller to form a predetermined pattern on said receiver means, and confining the materials and restricting its deposition into a predetermined area of said receiver means.

15. The method of applying material to a receiver as in claim 14 including the step of determining the exact predetermined portion of material by weighing it prior to depositing it in said distribution means.

16. The method of applying material to a receiver as in claim 15 wherein said exact predetermined portion weight is achieved by causing said first conveying means to move incrementally until the exact weight is achieved and then stopping movement thereof.

17. The method of applying material to a receiver as in claim 14 wherein the spinning impeller is mounted on a vertically-oriented shaft.

18. A multipurpose applicator for applying a predetermined portion of materials to a predetermined area of a receiver comprising:

a material container to provide a supply of materials to be applied to the receiver;

a first conveyor positioned adjacent the material container to move the materials incrementally in a path from the material container to an application location from which the material may be applied to the receiver;

a second conveyor to move the .receiver to a predetermined location where the materials are to be applied;

a metering device having spaced disks rotatable about a central axis through the disks, the spaced disks positioned on opposite sides of the first conveyor, and a plurality of transverse members extending between the disks, each transverse member having a plurality of depending members extending therefrom wherein the depending members rake the materials moved from the material container by the first conveyor to assure that each increment of the first conveyor has the same predetermined portion of materials thereon, wherein the device further includes means for adjusting an angle of the depending members relative to a vertical axis such that the distance between the depending members and an upper surface of the first conveyor is varied to regulate the material moved by the first conveyor;

a distributor having a rotatable shaft with an impeller mounted thereon, wherein the predetermined portion of materials is delivered by the first conveyor to the rotating impeller which contacts the predetermined portion to create a dispersion of the predetermined portion of materials that falls in uniform distribution onto the predetermined area of the receiver; and a control system for synchronizing the operation of the first and second conveyor and distributor.

19. The multipurpose applicator of claim 18 wherein the distributor further includes a mask having an open bottom end, the mask being positioned around the impeller, wherein the mask contains the dispersion of the predetermined portion of materials which falls through the open bottom end to conform the uniform distribution of materials onto the predetermined area of the receiver.

20. The multipurpose applicator of claim 18 further including a second metering device, positioned adjacent to the first metering device, and having depending members to rake the materials on the first conveyor a second time, the second metering device having means for adjusting an angle of the depending members relative to a vertical axis such that the distance between the depending members and an upper surface of the first conveyor is varied to further regulate the material moved by the first conveyor.

21. A method of applying a predetermined portion of materials to a predetermined area of a receiver comprising the steps of:

providing a supply of materials;

moving the materials from the supply along a first conveyor in defined increments;

providing a rake means for contacting the materials having depending members, the rake means further comprising means for adjusting an angle of the depending member relative to a vertical axis such that the distance between the depending members and the first conveyor means is varied to regulate an amount of materials moved by the first conveyor;

raking the materials being moved by the first conveyor to spread a uniform amount of materials along the first conveyor to assure that each increment of materials moved by the first conveyor has a predetermined portion of materials thereon;

moving the receiver along a second conveyor into a position to receive the predetermine portion of materials;

depositing the predetermined portion of materials into a distributor having a spinning impeller wherein the portion of materials is dispersed by the impeller; and confining the dispersion of the predetermined portion of materials wherein the portion of materials falls through an open bottom end of the distributor onto a predetermined area of the receiver.

22. Apparatus for providing a predetermined portion of materials comprising:

a material container to provide a supply of materials;

a means for transporting the supply of materials along a path from the material container in defined increments; and a metering device having spaced disks rotatable about a central axis through the disks, the spaced disks positioned on opposite sides of the means for transporting and a plurality of transverse members extending between the disks, each transverse member having a plurality of depending members extending therefrom wherein the depending members rake the materials transported from the material container to assure that each increment of the means for transporting has the same predetermined portion of materials thereon, the metering device having means for adjusting an angle of the depending members relative to a vertical axis to vary the distance between the depending members and the means for transporting to regulate the materials transported.

* * * * *